Figure 1:
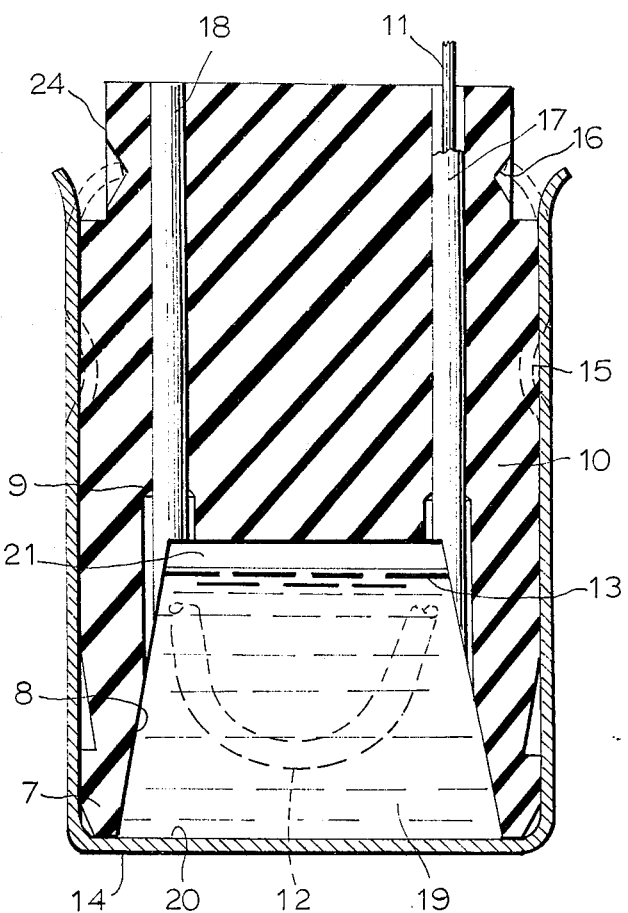

United States Patent [19]

Jones, Jr.

[11] 3,944,894

[45] Mar. 16, 1976

[54] ELECTROLYTIC TIMER CAPSULE WITH RUPTURABLE FILAMENT ANODE

[75] Inventor: John Paul Jones, Jr., Wayne, Pa.

[73] Assignee: Air Products and Chemicals, Inc., Allentown, Pa.

[22] Filed: June 19, 1973

[21] Appl. No.: 371,515

[52] U.S. Cl. .............................................. 317/232
[51] Int. Cl.² ......................................... H01G 9/18
[58] Field of Search.................... 324/76 A, 94, 182; 317/232, 231, 230

[56] References Cited
UNITED STATES PATENTS

| | | | |
|---|---|---|---|
| 3,423,644 | 1/1969 | Mintz | 317/231 |
| 3,564,347 | 2/1971 | Peck et al. | 317/230 |
| 3,711,751 | 1/1973 | Jones | 317/231 |

*Primary Examiner*—Alfred E. Smith
*Attorney, Agent, or Firm*—James C. Simmons; Barry Moyerman

[57] ABSTRACT

Electrolytic timer capsules disclosed herein are of the type having an anode filament ruptured by electrolytic action at a known end-of-life time. These capsules are identified by a configuration of housing and electrodes that concentrates electrolytic action on a known portion of the filament anode to produce the rupture which is detectable between two extending lead terminals of the filament. Thus, the anode or cathode and surrounding electrolyte body is shaped to concentrate the electric field and ion migration patterns at the specified location at which rupture occurs. Hermetic sealing of the electrolyte within the capsule is afforded by clamping a resilient surrounding insulating body forming together with the cathode a compartment for receiving the electrolyte solution by indenting the metallic cathode electrode forming with the insulating body a hermetically-sealed, low-cost, dispensible, timer capsule.

4 Claims, 5 Drawing Figures

ELECTROLYTIC TIMER CAPSULE WITH RUPTURABLE FILAMENT ANODE

This invention relates to electrolytic coulometric cells for measuring the time a constant electric current is passed therethrough and more particularly it relates to those type coulometric cells that have an end-of-life signifying a known time by rupture of an anode filament.

Extreme consistency of manufacturing conditions is necessary in coulometric cells in order to measure time periods with accuracies of better than 5 percent. Variations in electrolyte solution, purity of electrodes, critical spacings between electrodes, contamination during use or processing, leakage of solution, voltaic action and sneak conductive paths can all lead to variations from theoretical time calculations. In assuring all these conditions with prior art cells the manufacturing cost tends to be high and reliability low.

Some specific problems encountered with a cell of the rupturable anode filament type might include for example, (1) inconsistency of the filament anode rupture because of voltage variations therealong, (2) leakage of electrolyte to cause shelf life, sneak path or corrosion problems, (3) variations in electric field patterns through the electrolyte resulting in inconsistent performance, (4) complexity of manufacturing process and assembly operations making it difficult to meet quality control conditions, and (5) need for expensive or critical electrode materials or capsule configurations.

It is therefore a general object of the invention to provide an improved and accurate cell solving the foregoing problems.

More specific objects of the invention are to provide long shelf life and to produce consistent end-of-life time spans with few simple low cost elements easy to assemble and manufacture.

Another object of the invention is to provide a low cost but accurate dispensible hermetically sealed coulometric cell.

Therefore in accordance with this invention, a cell is constructed of basic elements consisting of an anode filament, an electrolyte solution and a cathode-insulator housing arrangement providing a hermetically sealed compartment containing the solution. In order to produce consistent end-of-life times without critical manufacturing tolerances and materials the cells have a configuration concentrating the ionic migration and electric field pattern in the electrolyte on a known portion along the anode filament. Preferably the filament is mounted to mechanically stress this portion to aid rupture at the end-of-life. The hermetic seal is afforded by use of a resilient insulating body which is clamped in place by deformation of the cathode electrode.

Further features, objectives and advantages of the invention will be realized by consideration of the following detailed description of the preferred construction features of several embodiments of the invention shown in the accompanying drawings, wherein...

Figure 2:
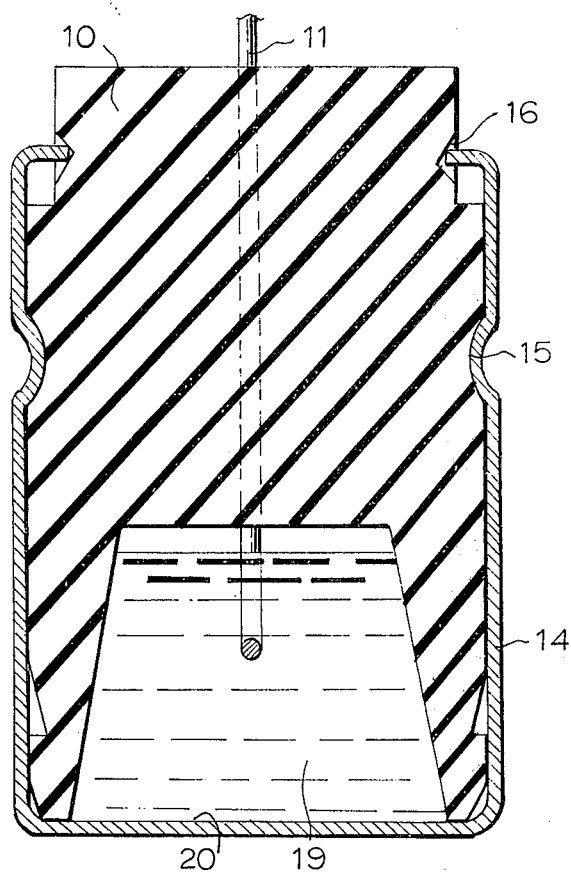
Figure 3:
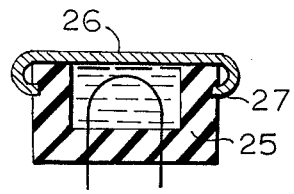
Figure 4:
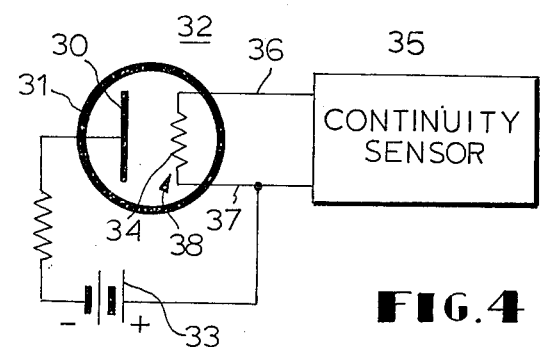
Figure 5:
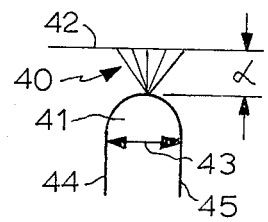

FIG. 1 is a side fragmentary view in section of a cell constructed in accordance with a preferred embodiment of the invention, FIG. 2 is a section end view of the cell of FIG. 1 taken normally thereto, FIG. 3 is a further embodiment of a cell constructed in accordance with the teachings of this invention, and FIGS. 4 and 5 are respective equivalent diagrams of the circuit and electric field configurations of the cell in use.

The cell of FIGS. 1 and 2 is of the type described in my U.S. Pat. No. 3,711,751 granted Jan. 16, 1973 and my copending application Ser. No. 272,431 filed July 17, 1972. Basically the cell comprises an insulating body 10 through which external leads 11 extend from a generally U-shaped anode filament structure 12 immersed in an electrolyte solution 13 to plate off onto a cathode can 14. The insulating body 10 is generally cylindrically shaped of an elastomer or a resilient plastic material such as "Neolite" or "Kel F" which can be compressed resiliently be indentations 15, 16 made in the outer cathode cup like can 14. The terminal leads 11 extend through apertures 17, 18 in the insulating body of greater diameter than that of the lead wires, so that air may escape therearound during assembly of the capsule.

When the indentation groove 15 is made about cylindrical cup anode 14 therefore the resilient material of body 10 is pressed against the leads to form a hermetic seal preventing electrolyte 13 from leaking out of the electrolyte compartment 19 formed between the insulating body 10 and cathode can bottom 20. A conventional air space 21 is left above the electrolyte solution. Also the rim of the cathode can is indented 16 into the resilient insulating body material 10 to form a second seal.

The anode and cathode are preferably copper with a copper sulfate electrolyte solution. Thus materials of reasonable purity are inexpensive and non-critical. Variations in configuration of the basic elements may be made without departing from the scope or nature of this invention as for example seen from the configuration of FIG. 3, where the insulating body 25 is cup-like in shape with circular flat cathode electrode 26 forming a hermetic seal by a rolled over edge 27 contacting and indenting the resilient insulating body surface.

Some of the details of the construction are important. Thus, in the configurations of this invention by using few elements and unlayered insulating bodies, the occurrence of sneak electrical paths and corrosion by leakage of electrolyte along a layer is prevented. The basic hermetic sealing action is equivalent to that of a cork which in compressed condition tightly and hermetically seals under various conditions of temperature, pressure and aging. Thus the sealing as taught in this invention is not only critical in function but is important in achieving uniformity because of its simplicity of manufacture, since such crimping techniques for the cathode are well known in the construction of electric components for electron guns and electrolytic capacitors, for example. Therefore the indentation procedure can be carefully controlled to put consistent pressure about the leads 11 bending them only enough to attain desirable physical stress to aid the consistent and critical to-end-of-life time duration afforded by the capsules constructed by the teachings of this invention. The stress feature will hereinafter be discussed.

In order to understand the critical matter of achieving a known and repeatable rupture time for the anode filament 12 designating the end-of-life of a low cost disposable cell as afforded herein, the equivalent circuit diagram of FIG. 4 may be considered as typifying a cell nearing end of life. Thus the cathode 30 in a container 31 with electrolyte solution therein receives ions from the anode filament 32 migrating through the solution and plating onto the cathode 30 when battery 33 or other constant current source is connected between the cathode 30 and anode filament 32. The resistor 34 represents a portion of the anode filament reduced in cross section or partly eroded away. This can occur because of an impurity center at various positions along anode filament 32. Also because of slight variations in surface deformity of anode or cathode electrodes a preferred electric field pattern or ion path may be set up in a somewhat random fashion, which is not readily subject to quality control without provision of optical-like surfaces and high purity electrodes.

The resistance function is undesirable since it tends to prevent a rupture of the anode filament 32 between leads 36, 37 so that detector 35 may sense end of life by plating off enough anode filament material to rupture the path between leads 36 and 37. Accordingly, several undesirable actions may occur. For example, the resistance may cause enough emf drop along the anode filament 32 that the anode will replate upon itself or distort the field pattern of the electrolyte to erode away at other positions where there is a greater filament thickness. Also the plating action will be enhanced at position 38 because of the greater voltage between anode and cathode electrodes, rather than to rupture at the thinner higher resistance portion 34 of the anode filament. Accordingly it is difficult to control life or time to rupture within a reasonable tolerance such as 5 percent with other ordinary physical manufacturing tolerances with available materials and solutions of reasonable purity.

Accordingly to provide a cell with an accurately predictable end-of-life time, the critical techniques discussed hereinafter are employed by this invention.

Consider first the equivalent diagram of FIG. 5 with rays 40 typifying ion migration paths through an intermediate electrolyte from anode filament 41 to cathode plate 42. It is noted that by making the anode filament U-shaped a focussing effect will occur causing the closest point of the anode at distance d away from the cathode to have the greatest erosion and tend to rupture within the shortest time of any other position along the filamentary anode 41. Thus, the timing to end-of-life is controllable with a greater degree of accuracy by the electric focussing effect.

Further enhancement of the timing is also provided by mechanical structure of the U-shaped filamentary electrode, which is therefore the preferred structure. By bending in the U-shape the filament 41 then tends as it becomes thin by plating away to separate by the mechanical stress or tension at the focus point or apex of the U directed toward the cathode surface 42. This can be mechanically enhanced by mounting structure leverage signified by the block 43 providing pivot points so that pressure forcing the ends 44, 45 together as signified by the arrows will tend to cause the filament physically to separate under stress. This condition is incorporated in the embodiment of FIG. 1 for example simply by forcing the U up into the apertures 17, 18. It is further enhanced by pressing indentations 15 toward the filament wire leads 11 within apertures 17, 18. Accordingly quality control of end-of-life time can be readily afforded by simple use of the features of spacing between the cathode and a limited portion of the anode filament and by mechanically stressing the anode filament through bending and through resiliently pressing the wires with a resilient insulator body of the type employed herein. Note that if the mechanical tension is used with the focussing action or closer spacing of the apex of the U-shaped filament to the cathode, then the resistance action (34) of the thinner designated portion of the anode receiving most ionic activity will coincide mechanical stress, electrolyte focussing and a greater power drop since the greater ionic current will occur at the greater resistance portion to then cause a heating fuse-like separation.

All these advantages are attained with the further advantageous feature that impurities such as oxidation or salts on the surface of the anode leads for example will not prevent hermetic sealing as might occur if a cement type seal were used.

The construction of the device of FIG. 1 for example enhances the manufacture which simply requires insertion of U-shaped anode filament 12 into the insulating body 10 with terminal leads 11 extending therefrom as a first step. The body 10 is grooved at 8 and funnelled at 9 to aid the threading of the wire therethrough.

Then the electrolyte solution 13 is put in the bottom of cup 14 so that body 10 can be slid thereinto with wiper rims 7 being slightly compressed to push the electrolyte up into cavity 19 between cathode end wall 20 and the body 10. During this step air will flow out around leads 11 through apertures 17 and 18. Just enough electrolyte is metered into the cathode cup 14 to leave air space 21. Then the can is first dimpled at 15 for producing a hermetic seal and a leverage action on the anode filament, and thereafter the rim 16 is sealed at ridge 24 for a secondary hermetic seal.

It may therefore be seen that the techniques and features of this invention permit production of an electrolytic time cell of simpler construction yet with enhanced more accurate control over time to end-of-life. Those features of novelty representative of the nature and scope of the invention therefore are set forth with particularity in the appended claims.

What is claimed is:

1. An electrolytic timing capsule, comprising in combination, an electrolyte solution, a cup-like insulator containing said solution with a continuous filament anode element with an intermediate portion extending through the insulator into said solution with two terminal leads extending from said insulator outside said solution as terminals to detect discontinuity of the filament portion therebetween, a cathode element having a planar surface in contact with said solution arranged to close the cup-like insulator structure, said cup-like insulator comprising a resilient electrically insulating element confining said solution in a cup-like compartment holding the electrolyte disposed between said anode and cathode, and clamping means formed by configuration of said cathode for pressing said cathode and insulating element together in a hermetic sealed housing arrangement confining said solution wherein the two leads are held by said clamping means in said insulating element to maintain said intermediate portion in said electrolyte in a stressed condition of a sense assisting rupture of said filament at the end-of-life.

2. A capsule as defined in claim 1 wherein said anode comprises a generally U-shaped anode filament disposed with its apex toward said generally planar cathode structure wherein said insulator comprises a pivot arrangement for said leads and said clamping means is arranged to press said two leads in a direction forcing the lead ends together thereby tending to stress the intermediate portion outwardly in a sense assisting rupture of the intermediate portion of said filament in said electrolyte at the end-of-life.

3. A capsule as defined in claim 1 wherein the cathode comprises a generally cylindrical container cup having an open end receiving said insulating element to close the open end with said leads extending from said open end wherein the cathode cylindrical container has a single inner diameter and said insulator has an outer cylindrical surface fitting closely within said cathode container and reaching to the bottom of said cathode container cup.

4. A capsule as defined in claim 1 wherein said insulating element defines apertures for passing said filament leads therethrough and having a slightly greater dimension than the filament leads to permit passage of air therethrough about said filament during assembly before the cathode and insulating element are pressed in said clamping configuration thereby to close said insulating material hermetically about said filament leads.

* * * * *